No. 685,456. Patented Oct. 29, 1901.
A. M. LAWRENCE.
COFFEE POT.
(Application filed July 8, 1901.)
(No Model.)
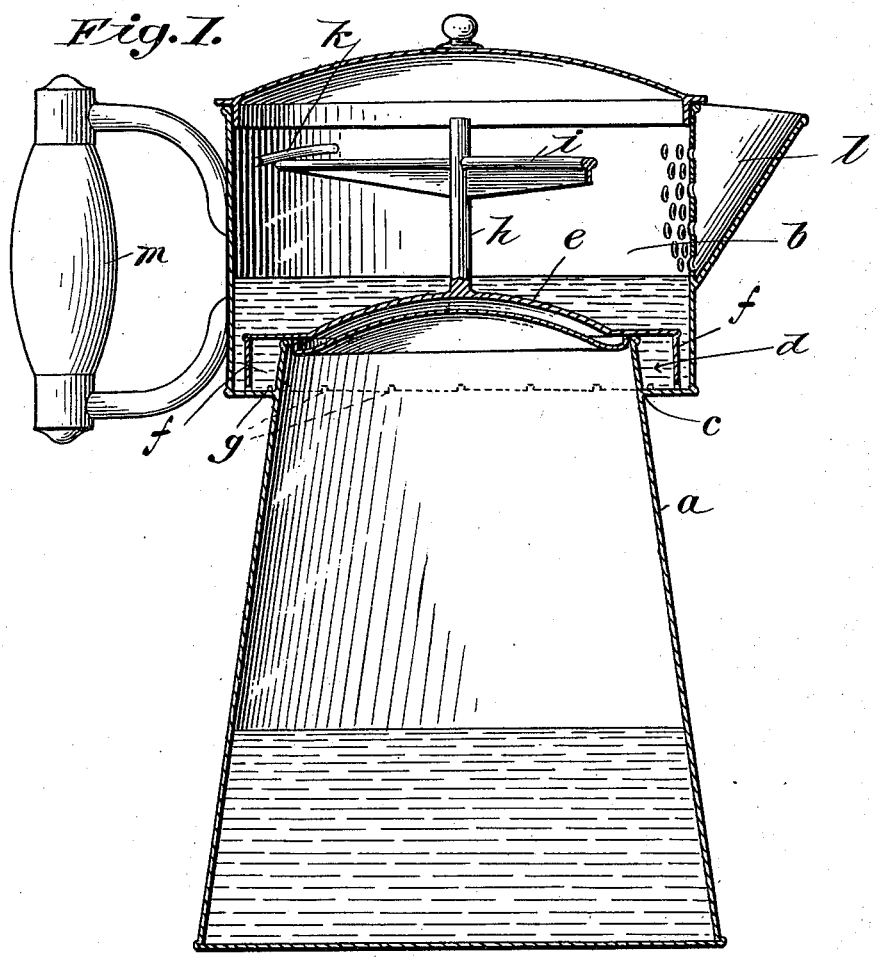
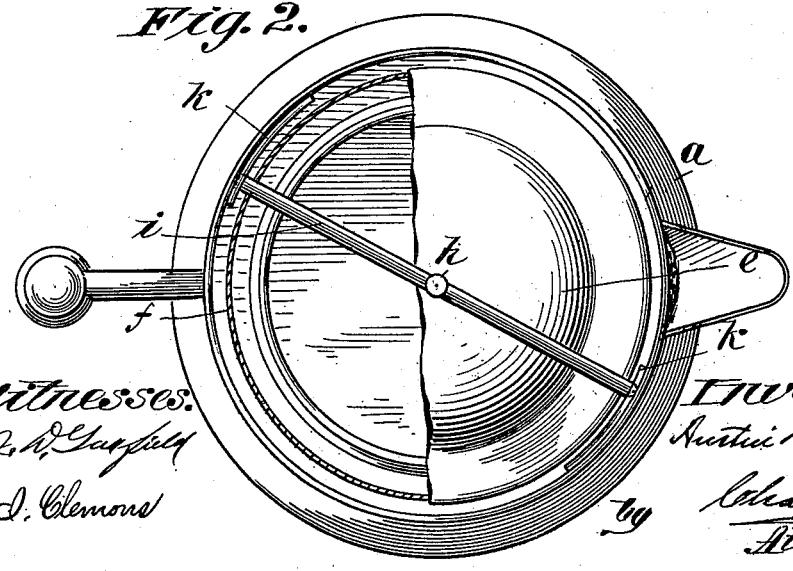
THE NORRIS PETERS CO., PHOTO-LITHO., WASHINGTON, D. C.

UNITED STATES PATENT OFFICE.

AUSTIN M. LAWRENCE, OF SPRINGFIELD, MASSACHUSETTS.

COFFEE-POT.

SPECIFICATION forming part of Letters Patent No. 685,456, dated October 29, 1901.

Application filed July 8, 1901. Serial No. 67,433. (No model.)

*To all whom it may concern:*

Be it known that I, AUSTIN M. LAWRENCE, a citizen of the United States of America, residing at Springfield, in the county of Hampden and State of Massachusetts, have invented new and useful Improvements in Coffee-Pots, of which the following is a specification.

This invention relates to coffee-pot construction, the object of the invention being to produce a coffee-pot in which the aroma of the coffee may be saved by the passing of the vapor arising during the operation of cooking through a body of water of relatively lower temperature, wherein the vapor may be condensed and the volatile essences of the coffee contained in said vapor be retained by said body of water, which is afterward automatically mingled with that in which the coffee has been cooked.

In the drawings forming part of this specification, Figure 1 represents a coffee-pot constructed according to my invention, the pot being shown in sectional elevation. Fig. 2 is a plan view of the top of the pot with the cover of the upper chamber of the pot removed and the cover of the lower compartment being broken away.

In carrying my invention into practice I construct a coffee-pot having a main chamber or compartment $a$, within which the ground coffee is placed, with a suitable quantity of water. Above this compartment $a$ is a second compartment $b$. The upper portion of the compartment $a$ extends through the bottom of the compartment $b$, the latter being secured to the side of the compartment $a$ all around the latter, as at $c$. This construction provides an upper and a lower chamber and around the lower portion of the chamber $a$ a channel $d$. The compartment $a$ is provided with a cover $e$, having thereon a depending flange $f$, substantially equal in height to that portion of the compartment $a$ lying above the bottom of the compartment $b$. Around the edge of said flange $f$ I prefer to cut a number of notches $g$, although these, while desirable, are not essential. The cover $e$ is so proportioned as to close the passage between the two chambers $a$ and $b$ by the bearing thereof on the upper edge of the compartment $a$ and by the bearing of the flange $f$ on the bottom of the compartment $b$ within said annular channel $d$. To hold said cover $e$ in place, I secure to the top thereof a post $h$, having the cross-bar $i$ thereon, the ends of which engage the under side of two short inclined ribs $k$, whereby by using the cross-bar $i$ as a handle and turning the same after the cover is in position the latter may be locked down in its place. The upper compartment $b$ is provided with the usual spout $l$. A suitable handle $m$ may be secured to any part of the upper or lower chamber.

By locating the spout $l$ on the upper chamber the necessity of providing a tight closure therefor is avoided, and while communication between the upper and lower chambers is cut off during the cooking operation by the water seal around the edge of the cover $e$ said seal is broken after the coffee is cooked, as will be described farther on, and the contents in the lower compartment may be poured out through the spout on the upper chamber. This construction is far more satisfactory than that which embodies the placing of the spout on the lower chamber, which in this class of coffee-pots could be closed only by a valve, the cost of which would be prohibitive.

In operating the invention a suitable quantity of coffee and water, preferably hot water, is placed in the compartment $a$, and the cover $e$ is then locked in position over the upper end of said compartment. A small quantity of water is now placed in the compartment $b$, this water being preferably cold, hermetically sealing the cover $e$, and the coffee-pot is placed upon the stove. The vapor formed by the application of heat to the water in the compartment $a$ will after having obtained a sufficient pressure force its way between the upper edge of the compartment $a$ and the cover $e$ and seek exit down through the water in the channel $d$ and then under and up outside of the depending flange $f$. The vapor, however, is condensed before it reaches the surface of the water, and whatever of the aromatic essential oils of the coffee-berry that may have been carried by the vapor are caught and held in solution in the water in the upper chamber $b$.

It is quite necessary for the proper operation of this apparatus that the volume of water within the chamber $b$ be maintained at a considerably lower temperature than that contained in the chamber $a$, and with that end in view I construct the chamber $b$ of larger diameter than the chamber $a$ in order that the water within the chamber $b$ may be exposed to the action of the heated vapor in the chamber $a$ to as slight an extent as possible, and I find from practical experience that the overhanging edge of the chamber $b$, exposed, as it is, on two sides, provides sufficient means for keeping down the temperature of the water within said channel to the required temperature for quickly and continuously condensing any vapor that may be forced therein from the chamber $a$.

By the use of a coffee-pot constructed according to this invention it has been found in practice that enough of the aroma of the coffee can be collected in compartment $b$ to make a beverage superior, if anything, to that obtained by cooking the coffee itself in the lower compartment $a$. For the purpose of preventing the water in the upper compartment $b$ from taking up heat from the lower compartment the cover $e$ is preferably made with a double wall, as shown in Fig. 1, whereby an air-space is provided between the inside of the chamber $a$ and the upper wall of the cover $e$, with which the water in said chamber is in contact. The coffee having been cooked for a sufficient length of time, the pot is removed from the stove and the colder air striking the sides of the compartment $a$ condenses the vapor therein, forming more or less of a vacuum, whereby all the water in the compartment $b$ is drawn over into the compartment $a$. Whatever small quantity there may be left in the channel $d$ is poured out when the coffee is served.

It is of course understood that the cover $e$ and the parts $h$ and $i$ are preferably removed before the liquid in the lower chamber $a$ is poured out. The liquid in said chamber $a$ would pass but very slowly under the cover $e$ if the latter were left in the position shown in the drawings during the pouring operation.

A great advantage in keeping the water in the compartment $b$ as cool as possible is that as it is drawn over into the compartment $a$ its lower temperature, as compared with the water in the latter compartment, serves to precipitate any sediment in suspension in the water in the compartment $a$, thus rendering it unnecessary either to artificially settle the coffee within the latter compartment or to wait for it to settle, and all of the beverage is finally inclosed in a practically-tight chamber, whereby its aroma is preserved.

Having thus described my invention, what I claim, and desire to secure by Letters Patent of the United States, is—

1. A coffee-pot comprising an upper and a lower chamber, the lower portion of the former projecting beyond the side wall of the latter, a channel in the upper chamber surrounding the upper end of the lower chamber, a cover for the latter, a flange on the cover projecting down into said channel, combined with means for securing said cover against the upper border of said channel, and a spout on said upper chamber, substantially as described.

2. A coffee-pot comprising an upper and a lower chamber, the lower portion of the former projecting beyond the wall of the latter, a channel in the upper chamber surrounding the upper end of the lower chamber, a cover for the latter, a flange on the cover projecting down into said channel and bearing on the bottom of the latter, notches in the edge of the flange, inclined ribs on the inner surface of the upper chamber, and means of engagement between the cover and said ribs whereby the rotation of the cover will force the latter tightly against the upper edge of the wall of the channel, substantially as described.

3. A coffee-pot comprising an upper and a lower chamber the lower portion of the former projecting beyond the side wall of the latter, a channel in the upper chamber surrounding the upper end of the lower chamber, a double-walled cover for the latter whereby an air-space is provided between said chambers, a flange on the cover projecting down into said channel, combined with means for securing the cover against the upper border of the channel, and a spout on said upper chamber substantially as described.

4. A coffee-pot comprising an upper and a lower chamber having an opening between said chambers, a spout entering said upper chamber, a channel adapted to contain water surrounding said opening, a cover for the latter, a flange on said cover projecting down into said channel, combined with means for removably securing said cover over said opening whereby the contents of said lower chamber may be poured through said spout on the upper chamber, substantially as described.

AUSTIN M. LAWRENCE.

Witnesses:
K. I. CLEMONS,
WM. H. CHAPIN.